United States Patent [19]
Higginbotham

[11] Patent Number: 5,878,458
[45] Date of Patent: Mar. 9, 1999

[54] ELECTRONIC CARD LOCK CLEANER

[76] Inventor: William Earl Higginbotham, 813 Wingo St., Orlando, Fla. 32803

[21] Appl. No.: 880,221

[22] Filed: Jun. 23, 1997

[51] Int. Cl.$^6$ .................................................. A47L 13/10
[52] U.S. Cl. ........................ 15/104.94; 15/97.1; 15/210.1
[58] Field of Search ............................... 15/97.1, 104.93, 15/104.94, 210.1

[56] References Cited

U.S. PATENT DOCUMENTS

| | | |
|---|---|---|
| 3,763,352 | 10/1973 | Del Rio et al. . |
| 3,805,027 | 4/1974 | Azure, Jr. . |
| 3,889,310 | 6/1975 | Barouh et al. . |
| 4,100,643 | 7/1978 | Horian et al. . |
| 4,933,015 | 6/1990 | White .................................. 15/104.94 |
| 4,984,120 | 1/1991 | Satoh et al. . |
| 5,227,226 | 7/1993 | Rzasa . |
| 5,525,417 | 6/1996 | Eyler ...................................... 15/210.1 |
| 5,560,067 | 10/1996 | Brook .................................. 15/104.94 |

FOREIGN PATENT DOCUMENTS

| | | | |
|---|---|---|---|
| 1961899 | 8/1971 | Germany ............................ 15/104.93 |

*Primary Examiner*—Randall E. Chin
*Attorney, Agent, or Firm*—James H. Beusse; Holland & Knight LLP

[57] ABSTRACT

Apparatus for cleaning of a magnetic read head in an electronic lock assembly includes an elongated, generally flat plate member adapted for insertion into a key card slot in the lock. An absorbent cleaning strip extends lengthwise over the flat plate member and is aligned so as to rub over the magnetic read head in the lock assembly when the plate member is inserted into the lock. The portion of the cleaning strip which extends over the plate member is only a minor portion of the total length of the strip, the remaining portion of the strip being stored in a housing or container attached to the plate member. The strip is advanced from the housing over the plate member each time the lock is desired to be cleaned. The strip is preferably an absorbent material and is saturated in a solvent within the storage housing. The housing further includes a take-up reel for collecting used portions of the strip material.

9 Claims, 1 Drawing Sheet

ELECTRONIC CARD LOCK CLEANER

BACKGROUND OF THE INVENTION

The present invention relates to cleaning of magnetic read heads and, more particularly, to a method and apparatus for cleaning a magnetic read head in an electronic card reader such as that used in hotel electronic door locks.

Plastic cards with magnetic strips for recording data are well known. For example, credit cards, ATM cards, identification cards, data storage cards, i.e., "smart" cards, all include a magnetic strip with selected encoded information. The encoded information can be "read" from the card by a magnetic read head by passing the magnetic strip over the read head. Various types of card readers with such read heads are known in the art. One use of an identification card with magnetic strip is to unlock an electronic lock such as may be used on hotel/motel room doors. The use of such electronic locks is particularly advantageous since such use enables the hotel/motel operator to change unlock codes for each new guest and avoid the theft problem previously associated with fixed key locks. However, maintenance of such card readers requires frequent cleaning of the magnetic read head which is recessed within the lock. Such cleaning is difficult since the typical electronic door lock requires insertion of the key card into a receiving slot rather than a "swiping" slot of the type used in credit card point of purchase devices.

One known method of cleaning magnetic read heads in electronic key locks uses a key card with a strip of solvent absorbing material bonded to the card in place of the magnetic strip. The material is believed to be a fibrous, short nap, synthetic. The cards are packaged in a sealed pouch with one card per pouch and are useable only for cleaning a single lock before discarding. In a hotel environment, the cost of purchasing a separate card for each cleaning of each lock can be a significant portion of the hotel maintenance budget, notwithstanding the time involved in opening each sealed pouch and the requirement of using the card quickly before the solvent evaporates. Thus, it would be advantageous to provide an electronic lock read head cleaning apparatus which is re-useable and can be used to clean multiple locks.

SUMMARY OF THE INVENTION

The above and other disadvantages of the prior art are overcome in an electronic lock read head cleaning apparatus which can be used to clean multiple locks. In an illustrative embodiment, the apparatus is disclosed as a device having an elongated flat plate member adapted for fitting into a key card slot in an electronic lock and having an absorbent cleaning strip positioned on the elongated member in such a manner that the strip can be advanced along the surface of the member in order to continually present a clean portion of strip to the read head within the lock without having to replace the entire apparatus. In an illustrative embodiment, the elongated plate member is attached to a housing containing a supply of an absorbent cleaning material in a strip form. The strip is preferably a cotton material that is woven in a form so as to have a minimum of loose threads. The strip of cotton material can be advanced out of the storage housing over the surface of the elongated plate member and maintained in tension over the member so as to be usable to wipe the read head within an electronic lock when the plate member is inserted into the lock. Within the container, the strip material may be stored on a reel to be played out as needed and the used portion of the strip material may be returned to the housing and collected on a second take-up reel. Preferably, the take-up reel includes an externally extending handle member which can be used to advance the take-up reel to pull clean strips of material from the storage reel. The housing is desirably generally air tight so that the strip material can be saturated with a solvent whereby fresh strips of material pulled from the housing onto the plate member will be saturated with solvent and aid in cleaning the read head. The flat plate-like member may also include a slot near its distal end for guiding the strip of material and to maintain alignment of the strip of material on the flat plate member for contact with the read head in the electronic lock assembly.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figures 1, 2, 3:
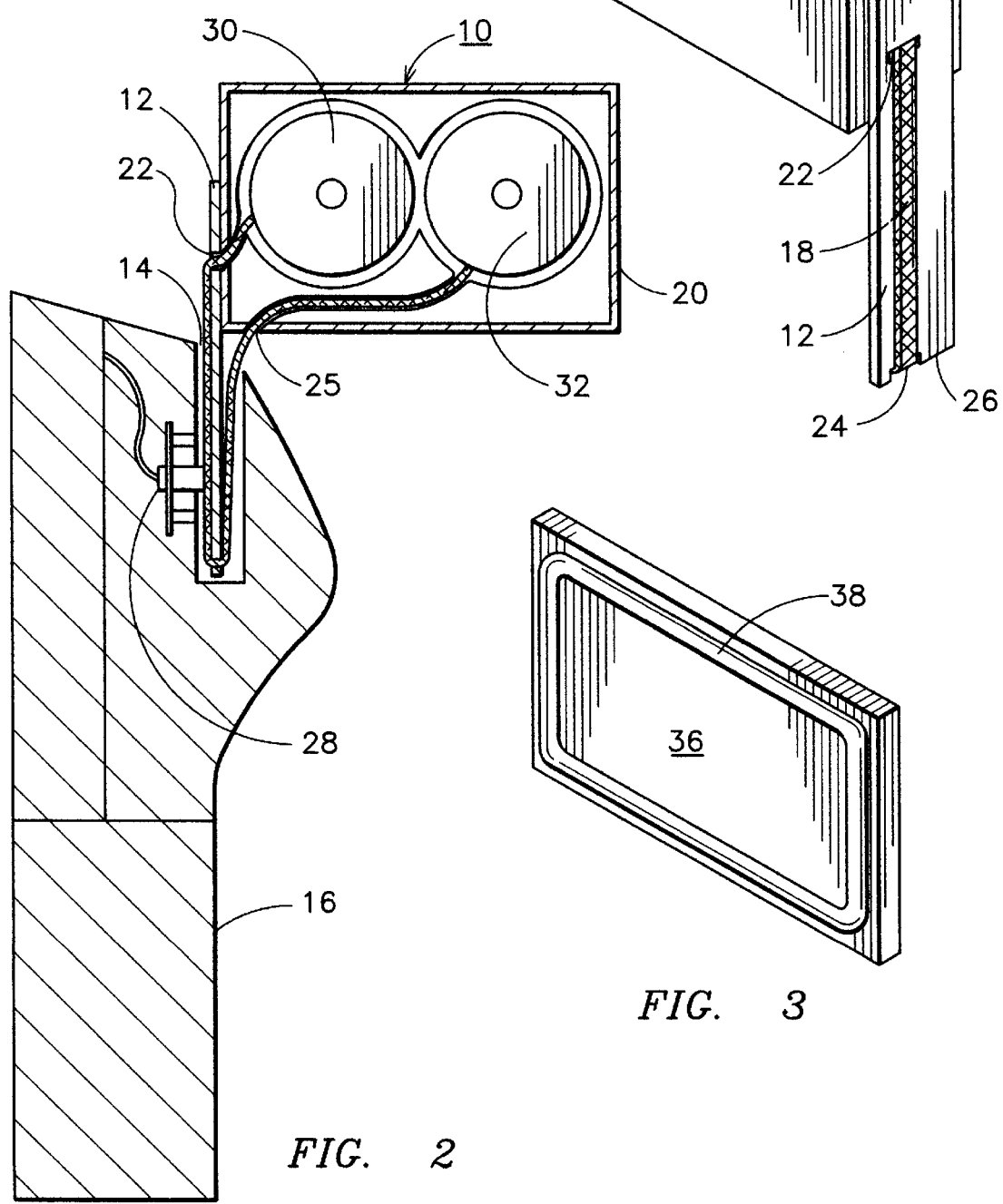
FIG. 1 is a front perspective view of an electronic card lock cleaning apparatus constructed according to the teachings of the present invention.
FIG. 2 is a plan view of the apparatus of FIG. 1 with the side cover of FIG. 3 removed.
FIG. 3 is a perspective view of the cover for the apparatus of FIG. 2.

Referring to the drawings in general and in particular to FIGS. 1 and 2, there is shown a front perspective view and a cross-sectional view, respectively, of one form of a magnetic read head cleaning apparatus 10 constructed in accordance with the teachings of the present invention. The apparatus 10 includes an elongated, generally flat member 12 adapted for fitting into a magnetic key card receiving slot 14 in a conventional electronic door lock 16. The member 12 may be of metal, e.g., aluminum, or a molded plastic. A movable strip 18 of absorbent material, preferably cotton, is supported on the member 12 and extends lengthwise of the member. The strip 18 is preferably an elongated strip of absorbent material and a major portion of the material is stored in a closed and generally sealed housing 20 to which the member 12 is attached. The housing 20 is preferably sized to function as a handle for the apparatus 10 and, while referred to as "attached" to member 12, may be integrally molded with member 12 from a plastic material. The strip 18 is fed out of the housing 20 through an aperture 22 and extends lengthwise of the member 12 passing over a guide slot 24 in an end 26 of the member 12. After passing through the slot 24, the strip 18 is returned to the storage housing 20 through aperture 25. While the aperture 22 is shown passing through member 12 and into housing 20, it will be apparent that the aperture could be located above the uppermost extent of member 12 since such location would be preferable if the member 12 is not integrally formed with housing 20 but separately attached thereto.

The strip 18 is movable over the member 12 by incrementally advancing the strip from the aperture 22 towards the slot 24. As shown in FIG. 2, the member 12 can be inserted into the card slot 14 in the same manner as a conventional key card would be inserted. Within the lock 16, there is positioned a magnetic read head 28 adapted for reading the magnetic information encoded on a magnetic strip on the conventional key card. The strip 18 is positioned on the member 12 such that when the member 12 is inserted in the slot 14, the strip 18 contacts the read head 28. By reciprocally moving the apparatus 10 with respect to the lock 16, i.e., at least partially withdrawing and re-inserting the member 12 in slot 14, the strip 18 will rub across the exposed end of the read head 28 and clean any dust or other debris that may be collected on the read head 28. Preferably, the strip 18 is saturated with a solvent when the strip is initially advanced out of the sealed housing 20 and at least a portion of the strip contacting the read head 28 is still moist with the solvent when the member 12 is inserted in lock 16. The preferred solvent is a conventional alcohol-based volatile material that quickly evaporates from non-absorbent surfaces such as read head 28. After swiping the read head 28 three to four times, the member 12 can be removed from the read head slot 14 and the solvent will evaporate from the read head within about fifteen to twenty seconds. However, because the strip 18 is formed from an absorbent, preferably a woven cloth material, the solvent drying or evaporating time is extended to several minutes allowing more than one lock to be cleaned before having to fully expose a new section of strip 18. It is believed that the strip 18 can be advanced a small amount, perhaps about 0.5 inches, between each lock if less than about two minutes expires between successive cleanings of locks.

As will be apparent, when it is desired to clean a lock, it is necessary to advance or initially move the strip 18 along the length of the member 12 so as to expose not only a clean portion of the strip 18 but also a portion which is moistened with a solvent. In the illustrated embodiment, this is achieved by wrapping the strip 18 on a reel 30 rotatable within the housing 20. A second take-up reel 32 is also positioned within the housing 20 for collecting the used portion of the strip 18. As shown in FIG. 1, a hand grippable knob 34 protrudes from one side of the housing 20 to enable manual rotation of the reel 32 in order to advance the strip 18. Various methods are available for applying solvent to the strip 18 including, for example, dipping the strip into a liquid solvent before winding the strip onto reel 30; soaking the reel 30 with the strip 18 pre-wound in a liquid solvent; or passing the strip 18 over a separate moistening apparatus as the strip is pulled from reel 30. However, preferably, the strip 18 is moistened after being wound on reel 30 by soaking the wound reel in a liquid solvent. It is anticipated that the cleaning solvent saturated strip and reel 30 can be replaced as a unit and that replacement units would be distributed in sealed packages. While a replacement unit should be replaced expeditiously to avoid evaporation of the solvent, the rolled strip 18 will minimize short term evaporation.

As mentioned, the solvent desirably evaporates relatively quickly without leaving any residue. Such characteristic generally requires that the housing 20 be very nearly hermetically sealed. This can be achieved by attachment of a cover 36, see FIG. 3, over the open side of the housing 20 with the cover 36 including an O-ring type seal 38. The cover 36 may be attached to the housing 20 in any conventional manner including threaded fasteners (not shown) but is desirably secured in a manner that will enable relatively easy removal so that a used strip 18 can be replaced to allow apparatus 10 to be re-used. With the cover 36 in place, the only openings are apertures 22 and 25 formed in the housing 20 for feeding out and collecting the strip 18. Preferably, each of these apertures 22, 25 is formed with a conventional flexible seal (not shown) around the edges of each aperture to minimize air leakage through the apertures. It is recognized that the apertures 22, 25 cannot be tightly sealed or the friction force on the strip 18 may become too strong to allow advancement of the strip or may wipe an excessive amount of solvent from the strip. However, with a reasonable pressure from a very soft sealing material such as a polyurethane, the apertures 22 and 25 can provide sufficient seal to provide a limited shelf life for the pre-moistened strip contained on the reel 30.

While the invention has been disclosed in what is presently considered to be a preferred embodiment, various modifications will become apparent to those skilled in the art. For example, it is possible to design the member 12 with a different configuration and to provide a different feeding and collecting mechanism for the strip 18. The knob 34 is merely exemplary of a means for enabling rotation of reel 32 and other apparatus such as a crank or a thumb wheel could be substituted. Accordingly, it is intended that the invention not be limited to the specific disclosed embodiment but be interpreted within the full spirit and scope of the appended claims.

What is claimed is:

1. Apparatus for cleaning a read head on an electronic lock, the lock including a slot for receiving a key card, said apparatus comprising:

an elongated, generally flat guide member adapted for insertion into the slot in the lock; and an absorbent cleaning strip extending over at least a portion of said guide member and aligned to engage the read head when said guide member is inserted in the lock, said cleaning strip being movable on said guide member for selectively positioning a clean section of said strip in engagement with the read head.

2. The apparatus of claim 1 and including an extended length of said cleaning strip supported for use with said guide member and dispensable over said at least a portion thereof.

3. The apparatus of claim 2 and including a cleaning strip storage housing attached to said guide member for storing said extended length of said cleaning strip.

4. The apparatus of claim 3 wherein said storage housing includes a pair of rotatable reels, one of said reels being wound with said extended length of cleaning strip and another of said reels being adapted for advancing and collecting said cleaning strip.

5. The apparatus of claim 4 wherein said storage housing is generally hermetically sealed about said reels.

6. The apparatus of claim 5 and including a cleaning solvent wetting said extended length of said cleaning strip.

7. The apparatus of claim 6 and including a guide slot formed in an end of said guide member for maintaining alignment of said cleaning strip on said guide member.

8. The apparatus of claim 7 and including means extending outward of said storage housing for enabling manual rotation of said another of said reels for advancing said cleaning strip along said guide member.

9. The apparatus of claim 8 and including a first aperture formed in said storage housing adjacent said one reel for passing said cleaning strip outward thereof on a first surface of said guide member and a second aperture formed in said storage housing adjacent another surface of said guide member opposite said first surface for passing said cleaning strip to said another of said reels.

* * * * *